United States Patent

Mahrus et al.

[11] 4,358,881
[45] Nov. 16, 1982

[54] METHOD FOR MANUFACTURING A PISTON WITH A SEPARATE SKIRT

[75] Inventors: Duraid Mahrus; Georg Daxer, both of Sao Paulo, Brazil

[73] Assignee: Metal Leve S/A Industria e Comercio, Brazil

[21] Appl. No.: 74,802

[22] Filed: Sep. 11, 1979

[30] Foreign Application Priority Data

Sep. 15, 1978 [BR] Brazil ................................ 7806090

[51] Int. Cl.³ .......................... B23P 15/10; F16J 1/02
[52] U.S. Cl. .................................. 29/156.5 R; 29/458; 92/190; 92/219; 92/223; 92/238; 92/212
[58] Field of Search ................. 92/187, 212, 219, 223, 92/224, 238, 190; 29/156.5, 458; 123/193 P; 72/47

[56] References Cited

U.S. PATENT DOCUMENTS

| | | | |
|---|---|---|---|
| Re. 18,814 | 5/1933 | Summers | 92/223 |
| 1,435,528 | 11/1922 | Keilholtz | 92/187 |
| 1,929,831 | 10/1933 | Teetor | 92/190 |
| 1,943,364 | 1/1964 | Betz | 92/187 |
| 2,077,688 | 4/1937 | Gottlieb | 92/224 |
| 2,162,830 | 6/1939 | Summers | 92/223 |
| 2,315,403 | 3/1943 | Dillon | 92/190 |
| 2,817,562 | 12/1957 | Fleming et al. | 92/212 X |
| 3,153,990 | 10/1964 | Kunzog | 29/458 |
| 3,455,018 | 7/1969 | Collins | 29/458 |

FOREIGN PATENT DOCUMENTS 352333  7/1931  United Kingdom ................. 92/190

*Primary Examiner*—Irwin C. Cohen
*Attorney, Agent, or Firm*—Steinberg & Raskin

[57] ABSTRACT

A method for manufacturing a piston for internal combustion engines, compressors and the like, comprising a head portion articulately connected to a separate skirt portion, wherein the skirt portion comprises a steel tubular part obtained by cutting, bending and closing of a piece of steel strip, the outer surface of said tubular part being covered by a layer of antifriction material bonded to said outer surface prior to the cutting, bending and closing of the steel strip.

8 Claims, 7 Drawing Figures

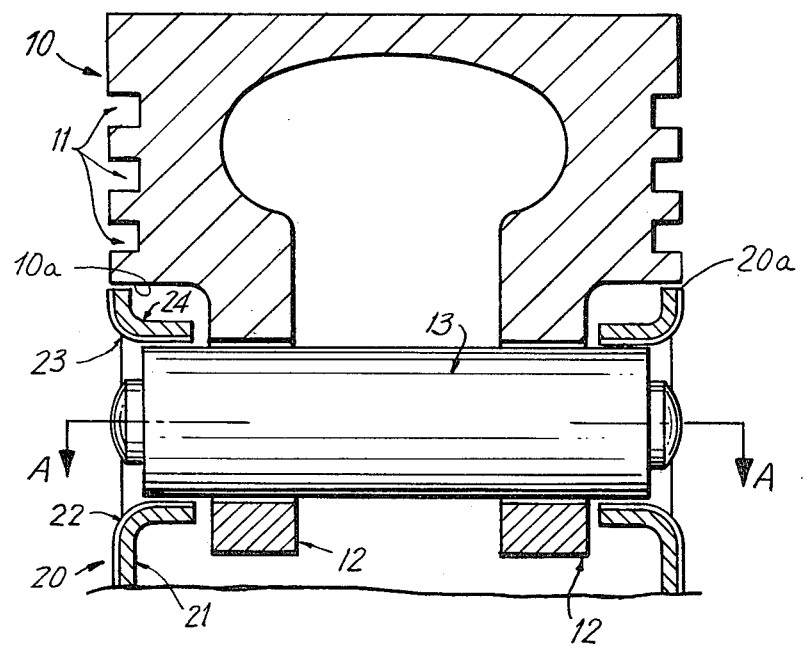
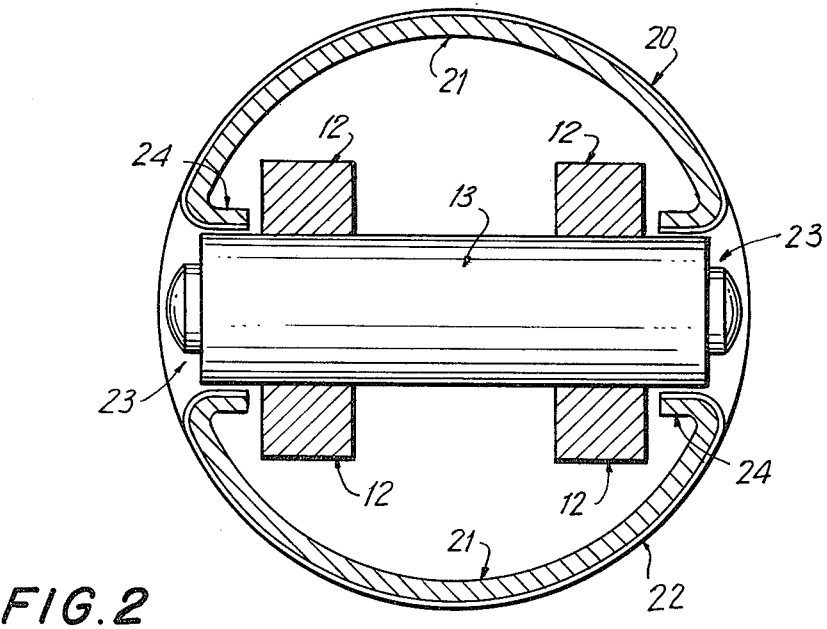

METHOD FOR MANUFACTURING A PISTON WITH A SEPARATE SKIRT

This invention relates to a piston for internal combustion engines, compressors and the like, said piston being composed of a head portion made from a material suitable to the thermal and mechanical operating conditions to which such pistons are normally subjected, and an independent skirt connected to the head portion and made from a composite material which may be bimetallic or otherwise.

As known, a conventional internal combustion engine piston is usually cast or forged in one-piece having a head portion adjoining the engine combustion chamber and being subjected to the high temperatures existing therein, transmitting pressures from combustion of gases to a connecting rod by means of the wrist pin bosses and the wrist pin and an integral skirt portion functioning merely as a guide to the piston inside the cylinder bore, by supporting only side thrusts resulting from changes in the angular position of the connecting rod. The piston head portion is provided with rings which seal the combustion chamber thereby preventing a blowby of combustion gases toward the crankcase and any excess lubricating oil from entering the combustion chamber.

On such conventional pistons, the skirt portion is machined to a complex configuration, namely an oval-shaped cross section and a barrel-shape along the piston's longitudinal axis, designed to offset thermal and mechanical deformities transmitted through the piston head. In this one-piece construction, the skirt portion, made from the same material as the head, usually an aluminum alloy having a thermal expansion factor much higher than that of the engine block, absorbs high temperatures present on the piston head, thus requiring the aforesaid complex machining operations in order to afford a proper distribution of clearances lengthwise of the piston during cold and warm conditions.

Recent efforts to eliminate the skirt-to-bore clearance during cold running include a piston having a head portion of aluminum alloy and an independent skirt made from ferrous metal or aluminum and articulated to the head portion. Such a design enables the skirt to be machined to a substantially cylindrical contour, for the physical separation (although small) between the skirt and head minimizes transmission of thermal and mechanical stresses to the skirt portion.

It is one object of the present invention to provide a piston having an independent skirt with a cylindrical contour thereby affording the following advantages:
1. A skirt made from a less expensive material.
2. An easier and less expensive machining as compared to that required for the one-piece construction.
3. Enables piston/cylinder assembly clearances to be maintained at constant values and approximately equal to zero even after engine warm-up (at normal running temperature), thereby minimizing "piston slap" caused by the changing lateral thrusts on the piston.
4. Reduces load losses caused by friction.
5. Provides a lighter piston, hence lower fuel consumption.

These and other advantages are attained by the piston of the invention, which comprises a metallic, e.g., aluminum alloy, head portion, and articulated to said head portion a cylindrical skirt portion made from a composite material comprising a thin anti-friction layer backed by a steel plate.

The skirt is made from a steel strip adapted to receive a thin anti-friction material layer of the type used on plain bearings, e.g., babbitt metal or any other material suitable to be bonded to the steel backing such as certain plastics, graphite, etc. The strip thus composed is then cut, formed into bushings and eventually closed by mechanical locking or by any other mechanical means or welding.

The wrist pin holes are machined and/or drawn depending on the pin articulation design. This articulation can be effected by means of supporting the wrist pin on the drilled and/or drawn hole or by additional pivot pins.

The bushing (skirt) outer surface with the antifriction material is machined to a final cylindrical contour.

The accompanying drawings illustrate by way of example various means of articulation between piston skirt and head.

FIG. 1 represents a cross-sectional elevation of a piston made according to the invention, depicting one means of articulation between the piston head and skirt.

FIG. 2 is a section view taken along line A—A in FIG. 1.

Figure 3:
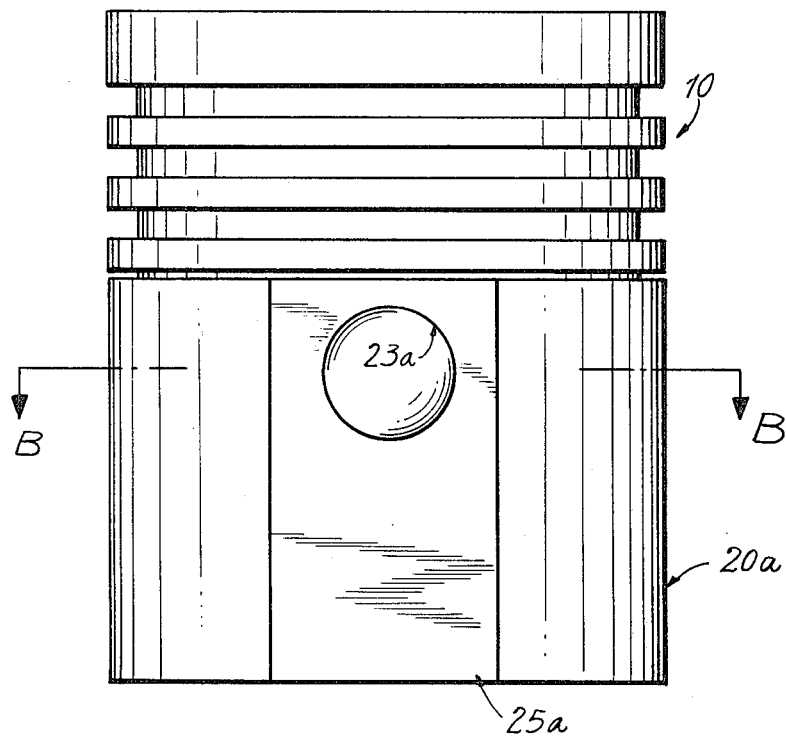
FIG. 3 represents a side elevation view of a piston embodying another means of articulation between the skirt and head.

As shown in FIGS. 1 and 2, the piston comprises a head portion 10 of aluminum alloy provided with conventional circumferential grooves 11 for insertion of sealing rings (not shown), and a pair of bosses 12 to accommodate wrist pin 13 which is pivotally connected to a connecting rod (not shown).

In this embodiment, the skirt portion 20 is fabricated from a steel strip suitably adapted to receive on one of its faces a layer of antifriction material of the type used on plain bearings.

Formation of the said strip composed of a steel backing and a layer of antifriction material may be achieved by means of a number of methods well-known in the art and suitable to the desired bonding, namely to the type of antifriction material which may be metallic or otherwise.

The composed strip is cut and bent to a cylindrical shape thereby forming the cylindrical skirt 20 having a steel backing 21 and an outer layer 22 of antifriction material which will be in contact with the engine cylinder wall.

The method of articulation between skirt 20 and head portion 10, as shown in FIG. 1, is carried out by means of the ends of wrist pin 13 itself, the said ends being inserted into matching holes 23 on skirt 20. Holes 23 extend inwardly along lips 24 which increase the bearing surface in contact with the ends of the wrist pin 13. As seen in FIG. 1, the skirt and head portions are articulated to each other in a manner such that the upper edge 20a of skirt 20 is spaced from the downwardly facing surface 10a of piston head 10, i.e., a small clearance is maintained between the skirt 20 and piston head 10 so that these portions do not contact each other.

Figure 4:
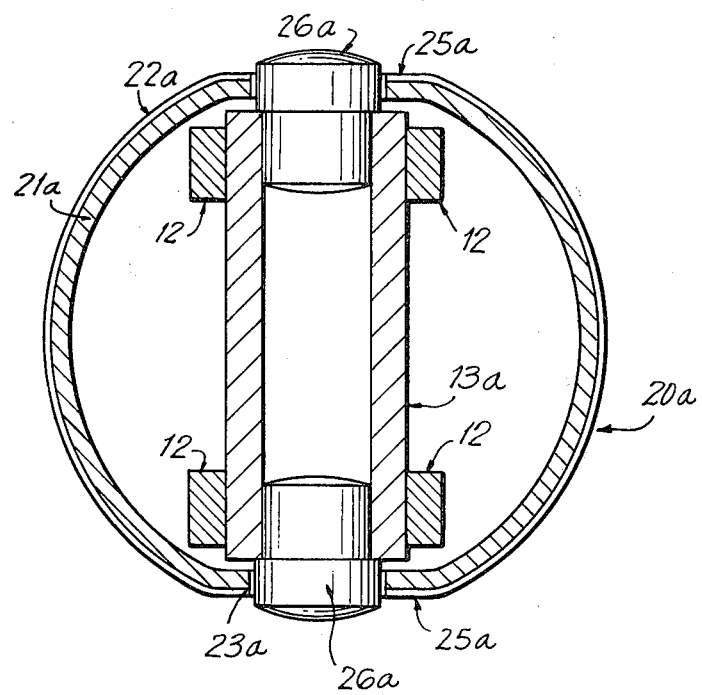
FIG. 4 represents a section view taken along line B—B in FIG. 3.

FIGS. 3 and 4 illustrate another method for articulation between head 10 and skirt 20a. In this embodiment skirt 20a has a cylindrical shape with two diametrically opposed longitudinal secants 25a, each of which is provided with a circular hole 23a into which a round head pivot pin 26a is inserted. The shank of each pivot pin 26a shank is inserted into a respective end of a hollow wrist pin 13a which connects the piston with a connecting rod. It is obviously understood that side flattenings 25a of skirt 20a and dimensions of pivot pin 26a are designed in such a manner as to enable the outermost face of pivot pin 26a round head to be tangent to the circumference defined by the circular outer portion of skirt 20a.

Figure 5:
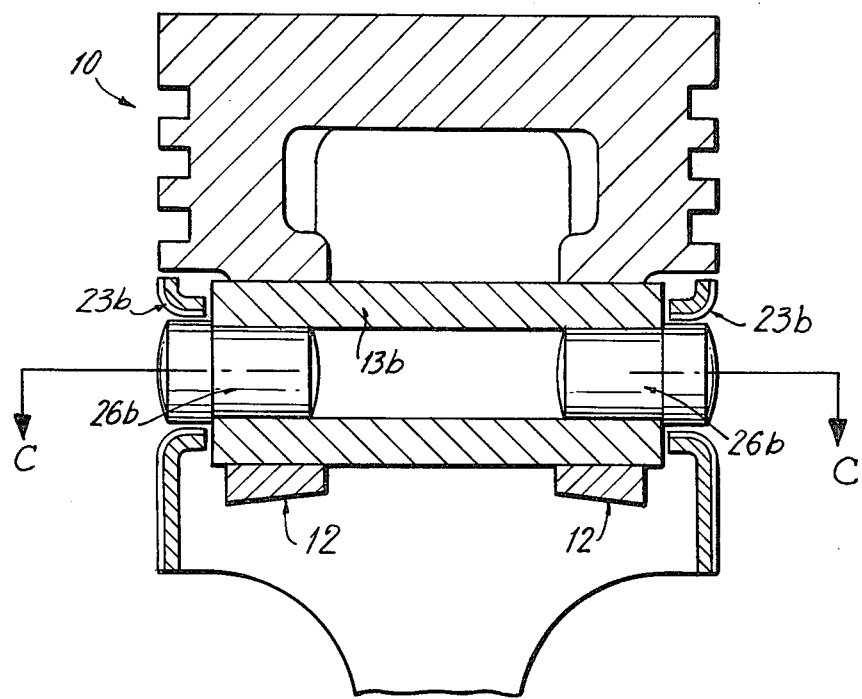
FIG. 5 represent a cross-sectional elevation of a piston according to the present invention illustrating yet another articulation means.
Figure 6:
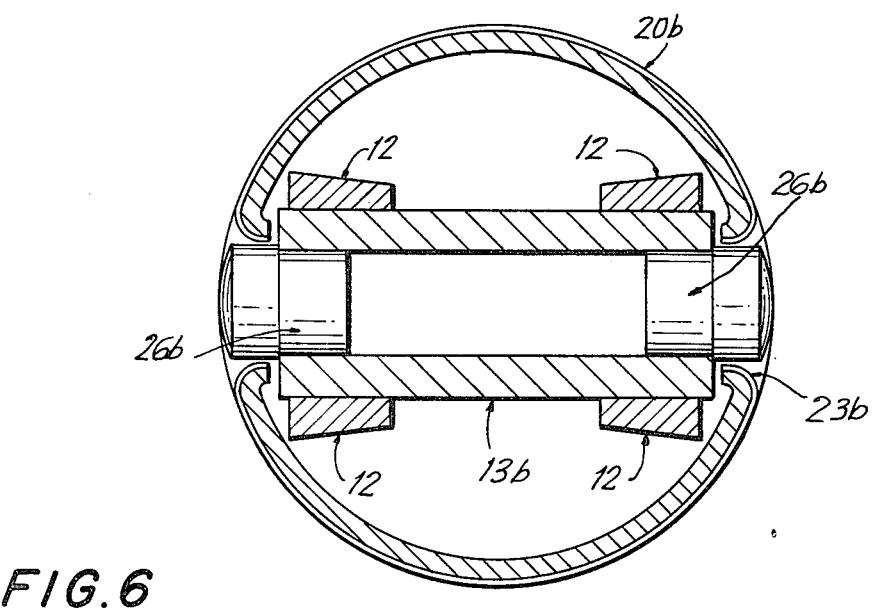
FIG. 6 represents a section view taken along line C—C in FIG. 5.

FIGS. 5 and 6 illustrate an articulation method similar to the one shown on FIGS. 3 and 4, except that skirt 20b has no flattenings. In this embodiment skirt 20b is provided with two holes 23b slightly drawn inwardly to accommodate the heads of pivot pins 26b.

Figure 7:
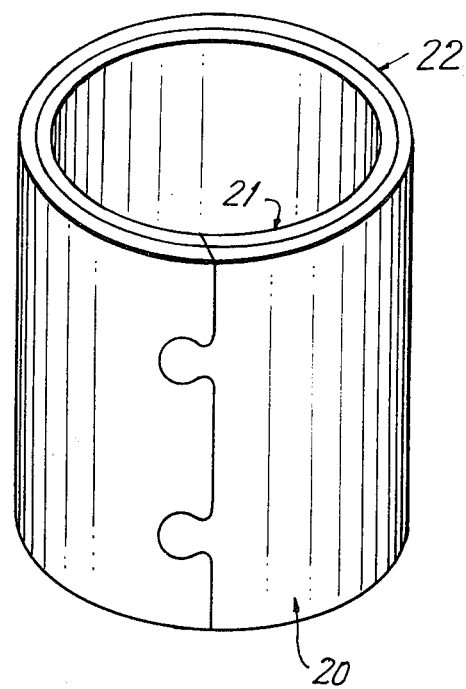
FIG. 7 illustrates one type of mechanical locking used to lock the skirt cylindrical formation.

FIG. 7 depicts a means of mechanically locking the ends of the composed strip in its final cylindrical shape.

Although the above detailed descriptions have been given to illustrate preferred means of articulation between the piston skirt and the piston head, other means may be employed without departing from the scope of the invention.

What is claimed is:

1. A method for manufacturing a piston for internal combustion engines, compressors, and the like, the piston including a head portion and a separate skirt portion, comprising the steps of:
   providing a strip of steel;
   bonding a layer of antifriction material to one of the surfaces of the steel strip;
   cutting, forming and locking the steel strip into a substantially cylindrical shape subsequent to said bonding step to form the skirt portion with said antifriction material on the outer surface of said skirt portion, forming a pair of articulation holes in said skirt portion, the walls of which include said antifriction material; and
   articulating the head portion to the skirt portion such that the same do not contact each other during operation.

2. A method as defined in claim 1, wherein the antifriction material is constituted by bearing material.

3. A method as defined in claim 1, wherein the antifriction material is an alloy containing one or several of the following components: lead, tin, aluminum, copper and graphite.

4. A method as defined in claim 1, wherein the antifriction material has at least on its contacting surface a plastic material.

5. A method as defined in claim 1 wherein a pair of bosses integrally extend from said head portion defining a pair of aligned openings, and said pair of articulation holes being aligned with said aligned openings, and wherein said articulating step includes extending wrist pin means through said aligned openings and holes.

6. A method as defined in claim 5 wherein said wrist pin means comprise a unitary member.

7. A method as defined in claim 5 wherein said wrist pin means comprise a hollow wrist pin and a pair of pivot pins inserted into respective ends of said hollow wrist pin.

8. A method as defined in claim 5 wherein said articulation holes are defined by inwardly extending drawn portions of said skirt portion.

* * * * *